United States Patent [19]
Winzen et al.

[11] Patent Number: 6,105,355
[45] Date of Patent: Aug. 22, 2000

[54] OPEN-END SPINNING DEVICE FOR PRODUCTION Z- OR S-TWISTED YARNS

[75] Inventors: Lothar Winzen, Heinsberg; Wolfgang Radermacher, Wegberg; Hans-Joseph Schröder, Mönchengladbach, all of Germany

[73] Assignee: W. Schlafhorst AG & Co., Moenchengladbach, Germany

[21] Appl. No.: 09/211,925

[22] Filed: Dec. 15, 1998

[30] Foreign Application Priority Data

Dec. 18, 1997 [DE] Germany .......................... 197 56 476
Sep. 10, 1998 [DE] Germany .......................... 198 41 406

[51] Int. Cl.$^7$ .................................................. D01H 4/00
[52] U.S. Cl. ............................... 57/406; 57/407; 57/411; 57/412
[58] Field of Search ............................. 57/406, 407, 411, 57/413

[56] References Cited

U.S. PATENT DOCUMENTS

| | | | |
|---|---|---|---|
| 3,875,732 | 4/1975 | Ellingham | 57/406 |
| 4,543,780 | 10/1985 | Muller et al. | 57/406 |
| 4,633,664 | 1/1987 | Mueller-Storz et al. | 57/406 |
| 5,471,829 | 12/1995 | Billner | 57/413 |
| 5,595,058 | 1/1997 | Billner | 57/413 |
| 5,622,040 | 4/1997 | Preutenborbeck et al. | 57/406 |
| 5,937,630 | 8/1999 | Wassenhoven | 57/407 |
| 5,953,896 | 9/1999 | Stahlecker | 57/411 |

FOREIGN PATENT DOCUMENTS

| | | |
|---|---|---|
| 1 161 186 | 1/1964 | Germany . |
| 26 34 070 A1 | 2/1978 | Germany . |
| 16 85 905 B2 | 9/1978 | Germany . |
| 32 05 566 A1 | 8/1983 | Germany . |
| 196 03 730 A1 | 8/1987 | Germany . |
| 197 29 191 | 7/1997 | Germany . |

*Primary Examiner*—William Stryjewski
*Attorney, Agent, or Firm*—Kennedy Covington, Lobdell & Hickman, LLP

[57] ABSTRACT

An open-end spinning device (1) with a spinning rotor (3) whose rotor cup rotates at a high speed in a vacuum-loaded rotor housing (2) closable by a conduit plate (27). The spinning rotor (3) is supported with its rotor shaft (4) in the bearing nip of a support-disk bearing (5) free of axial thrust and positioned in axial direction by a magnet bearing (18). The direction of rotation (S, Z) of the spinning rotor (3) can be selectively set via the direction of the rotor drive (V or R). The conduit plate (27) comprises a receptacle (34) in which exchangeable conduit-plate adapters ($12_S$ or $12_Z$) can be fixed in coordination with the particular direction of rotation (S or Z) of the spinning rotor (3).

11 Claims, 5 Drawing Sheets

OPEN-END SPINNING DEVICE FOR PRODUCTION Z- OR S-TWISTED YARNS

BACKGROUND OF THE INVENTION

The present invention relates to an open-end spinning device comprising a vacuum-loaded rotor housing, a spinning rotor having a rotor cup for rotation at a high speed within the rotor housing, and a conduit plate for closing the rotor housing, the spinning rotor being supported free of axial thrust.

Open-end spinning devices with spinning rotors rotating in support-disk bearings have long been known in the state of the art and are described for example in German Patent Publication DE 32 05 566 A1. These known spinning rotors generally have a rotor shaft supported in the bearing nip of two support-disk pairs and also have a rotor cup fixed on the end of the rotor shaft for rotation at a high speed in a vacuum-loaded rotor housing. Moreover, the rotor shaft often comprises a bearing component of a mechanical thrust bearing on its end opposite the spinning cup. The drive of such spinning rotors is typically accomplished via a tangential belt running the length of the machine.

In the known support-disk bearings, the shafts of the support-disk pairs are arranged with their rotational axes slightly crossed relative to the rotor shaft so that a component of axial force acts during the spinning operation on the rotor shaft to urge the rotor shaft into reliable contact with the thrust bearing arranged on the end of the rotor shaft.

Thus, the crossing of the axes of the support-disk pairs results, in conjunction with a given direction of travel of the tangential belt on the rotor shaft, in an axial force component active in the direction of the thrust bearing. A change in the direction of belt travel is not possible in such an apparatus since such would also result in a reversal of direction of the axial force component on the rotor shaft with the consequence that the rotor shaft would be urged out of contact with its thrust bearing and the spinning rotor would then contact against the cover of the rotor housing.

Subsequently published German Patent Publication DE 197 29 191 A1 describes an open-end spinning device in which the spinning rotor is supported with its rotor shaft in the bearing nip of a support-disk bearing free of axial thrust. In this support-disk bearing, the shafts of the support-disk pairs are arranged parallel to the rotor shaft. The axial positioning of the spinning rotor and of the rotor shaft in the bearing nip of the support-disk bearing is accomplished via a magnetic bearing acting on the end of the rotor shaft. Since the absence of axial thrust in such support-disk bearings makes the bearing independent as regards the direction of drive of the spinning rotor, reversible operation of the spinning rotor is possible both clockwise as well as counterclockwise with such an apparatus.

In addition, the subsequently published German Patent Publication DE 198 19 767.5 teaches an open-end spinning device in which the spinning rotor rotates free of axial thrust in electromagnetic bearings so as to be supported without contact within a bearing housing.

Moreover, German Patent Publication DE 196 03 730 A1 teaches an open-end spinning device comprising a replaceable adapter element in the area of a housing cover, i.e., the so-called conduit plate, which closes the rotor housing. Such a conduit-plate adapter which can be fixed in a replaceable manner in a recess of the conduit plate makes it possible in a simple and smooth manner to react rapidly in case of need to the particular technical spinning conditions. That is, if, e.g. during a batch change, which is often associated with a change of spinning rotor, the geometric conditions have changed in the spinning device, optimum spinning conditions can be reestablished by a simple replacement of the conduit-plate adapter.

Finally, German Patent Publication DE-AS 16 85 905 describes an open-end spinning device for producing S-twisted or Z-twisted yarn. That is, the directly supported spinning rotor of this open-end spinning device can be driven selectively clockwise or counterclockwise. The rotor housing of this known spinning device can be closed by a cover element comprising two separate fiber guide conduits. The two fiber guide conduits can be selectively connected to the output of a drafting device, depending on the direction of rotation of the spinning rotor.

However, this known device has a number of disadvantages which have prevented it from becoming accepted in practice. The high speeds required by modern textile machines can not be achieved permanently with directly supported spinning rotors. Moreover, the entire cover element must be replaced in this known device if, for example, the spinning geometry has changed in the spinning device on account of a change of the spinning rotor. It is correspondingly expensive to keep in stock such cover elements to be completely replaced. In addition, cover elements with two fiber guide conduits have the disadvantage that false air is constantly drawn into the spinning device through the inactive fiber guide conduit not connected to the drafting device, which results in a distinctly elevated consumption of energy of these devices.

SUMMARY OF THE INVENTION

In view of the above-described state of the art, it is an object of the present invention to provide an efficient, high production open-end spinning device capable of selectively spinning Z-twisted as well as S-twisted yarn in the spinning rotor thereof.

The present invention achieves this objective in an open-end spinning device basically comprising a vacuum-loaded rotor housing, a spinning rotor having a rotor cup for rotation at a high speed within the rotor housing, and a conduit plate for closing the rotor housing, with the spinning rotor being supported free of axial thrust. According to the present invention, the direction of rotation of the spinning rotor is selectively reversible and the conduit plate comprises a receptacle for selectively receiving an exchangeable conduit-plate adapter coordinated with the direction of rotation of the spinning rotor. The device in accordance with the present invention has the advantage that, due to the bearing of the spinning rotor being free of axial thrust, a reliable operation is continuously possible at very high rotational speeds both clockwise and counterclockwise. Moreover, the replaceable conduit-plate adapter, which can be coordinated with the particular direction of rotation of the spinning rotor, assures in a simple manner an optimum adaptation of the geometric conditions of the open-end spinning device. That is, Z-twisted or S-twisted yarn can be selectively manufactured without extensive conversion measures. All that is required in this connection is to set the direction of drive of the spinning rotor and to use the conduit-plate adapter suitable for the direction of rotation. The spinning machine can run at full operating speed thereby for both directions of yarn twisting, which has a positive effect especially on the efficiency of the machine.

In a preferred embodiment, the replaceable conduit-plate adapters are designed for a certain direction of rotation of the spinning rotor. That is, the fiber delivery mouth of the fiber guide conduit running within the conduit-plate adapter is arranged in such a manner that the individual fibers loosened in the sliver opening device are fed at an acute angle onto the yarn glide surface of the spinning means rotating either clockwise or counterclockwise.

It has been found to be especially advantageous if, during the manufacture of Z-twisted yarns, the fiber delivery mouth of the fiber guide conduit running in the conduit-plate adapter is connected in the mounted state of the conduit-plate adapter at an angle of less than about 25°, preferably at an angle of approximately 10°, to the centerline of the fiber guide conduit.

During the manufacture of S-twisted yarns a conduit-plate adapter should be used in which the fiber delivery mouth of the fiber guide conduit is connected at an angle greater than 40°, preferably approximately 45°, to the centerline of the fiber guide conduit.

The previously described design of the conduit-plate adapter assures that during the manufacture of Z-twisted yarns as well as during the manufacture of S-twisted yarns the individual fibers are fed in extended condition in almost parallel alignment onto the yarn glide surface of the spinning rotor rotating in the appropriate direction of rotation.

In an advantageous embodiment, the spinning rotor is supported with its rotor shaft in the bearing nip of a support-disk bearing whose support-disk pairs have shafts arranged in parallel so that the spinning rotor is mounted free of axial thrust. Axial fixing of the spinning rotor takes place preferably via a wear-free magnetic axial bearing.

In an alternative embodiment, the spinning rotor mounted in a galvanically separate manner as regards the bearing housing is supported both radially and axially in a magnetic bearing arrangement which can be supplied with current in a defined manner and with the spinning rotor driven by a direct electromotor drive, which makes very high rotor speeds possible with almost wear-free bearing support.

Further details, features and advantages of the invention can be understood from the following description of an exemplary embodiment with reference to the accompanying drawings.

DESCRIPTION OF THE PREFERRED EMBODIMENT

Figure 1:
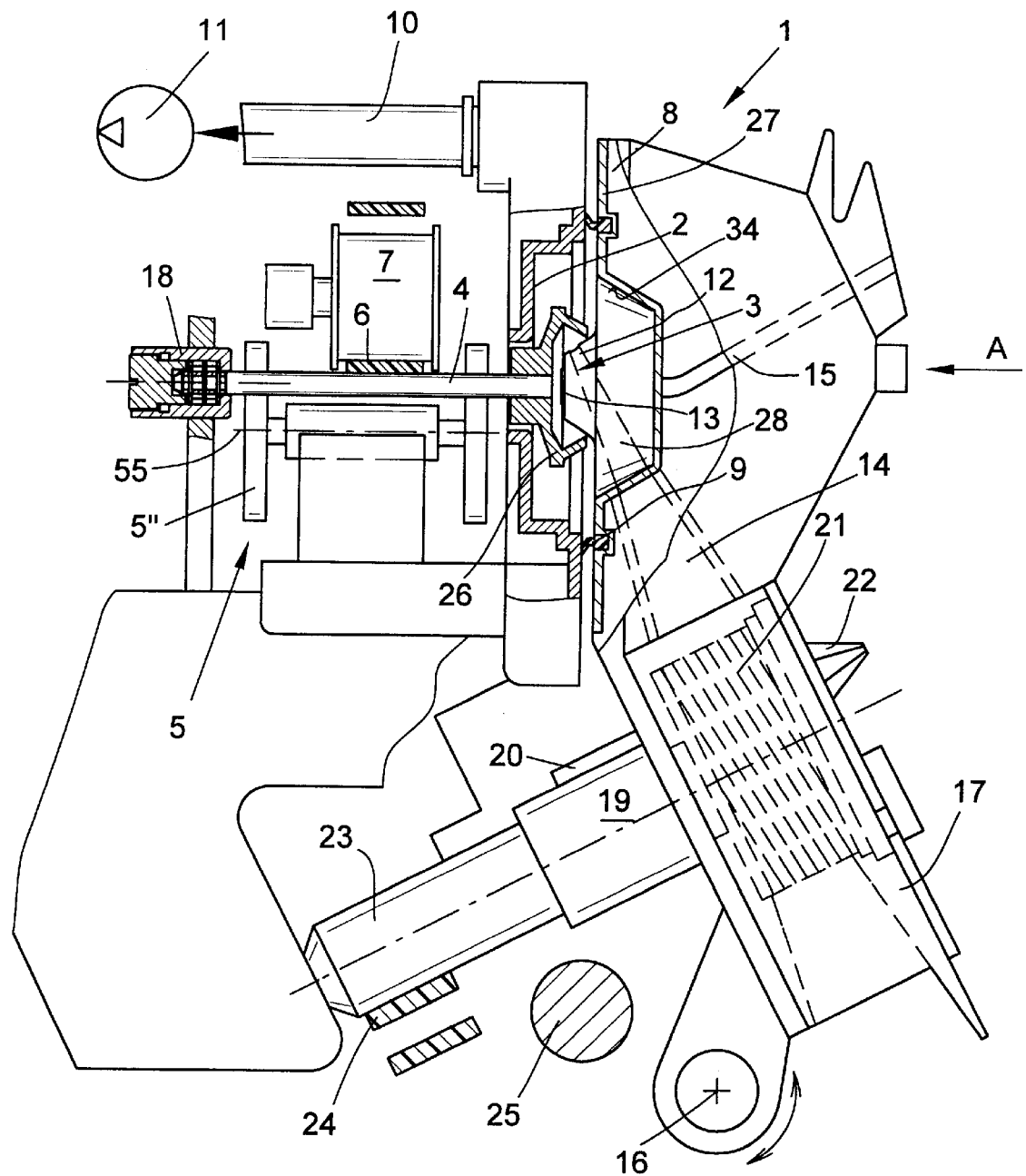
FIG. 1 is a side view, partially in cross section, of an open-end spinning device according to the present invention with a spinning rotor supported free of axial thrust and magnetically positioned.

Referring now to the accompanying drawings and initially to FIG. 1, an open-end spinning device is indicated generally by the reference numeral 1.

Spinning device 1 comprises, as is known, a rotor housing 2 in which spinning cup 26 of a spinning rotor 3 rotates at a high speed. Spinning rotor 3 is affixed to a rotor shaft 4 and is supported thereby with the rotor shaft 4 in the bearing nip of support-disk bearing 5 whose support disk pairs are mounted on parallel shafts so that the rotor shaft is free of axial thrust. The drive of spinning rotor 3 takes place, as is customary, via tangential belt 6 running the length of the machine, which belt is placed against rotor shaft 4 by pressure roller 7. Tangential belt 6 is driven via a reversible, frequency-controlled electromotor (not shown). The axial positioning of rotor shaft 4 in the bearing nip of support-disk bearing 5 takes place via permanent-magnet thrust bearing 18 without imposing axial thrust on the shaft 4.

As is customary, rotor housing 2 is open to the front side of the spinning device and is closed during the operation of spinning by a pivotably mounted cover element 8 having a conduit plate 27 with seal 9 which surrounds the rotor housing. In addition, rotor housing 2 is connected via an appropriate suction removal line 10 to vacuum source 11 which produces the spinning vacuum necessary in rotor housing 2.

A conduit-plate adapter 12, which according to the invention is in the form of an S-twist adapter $12_S$ (FIG. 3) or a Z-twist $12_Z$ (FIG. 2), is arranged in recess 34 of conduit plate 27. The conduit plate adapter 12 comprises yarn withdrawal nozzle 13 as well as fiber delivery mouth $28_S$ or $28_Z$ for a fiber guide conduit 14 described below. Yarn withdrawal tube 15 communicates with yarn withdrawal nozzle 13. Moreover, opening roller housing 17 is fixed on cover element 8, which is mounted so that it can rotate in a limited manner about pivot axis 16. In addition, cover element 8 comprises rear bearing consoles 19, 20 for supporting opening roller 21 and sliver draw-in cylinder 22. Opening roller 21 is driven thereby in the area of its whorl 23 by rotating tangential belt 24 running the length of the machine whereas the drive (not shown) of sliver draw-in cylinder 22 preferably takes place via a worm gear arrangement connected to drive shaft 25 running the length of the machine.

Figure 2:
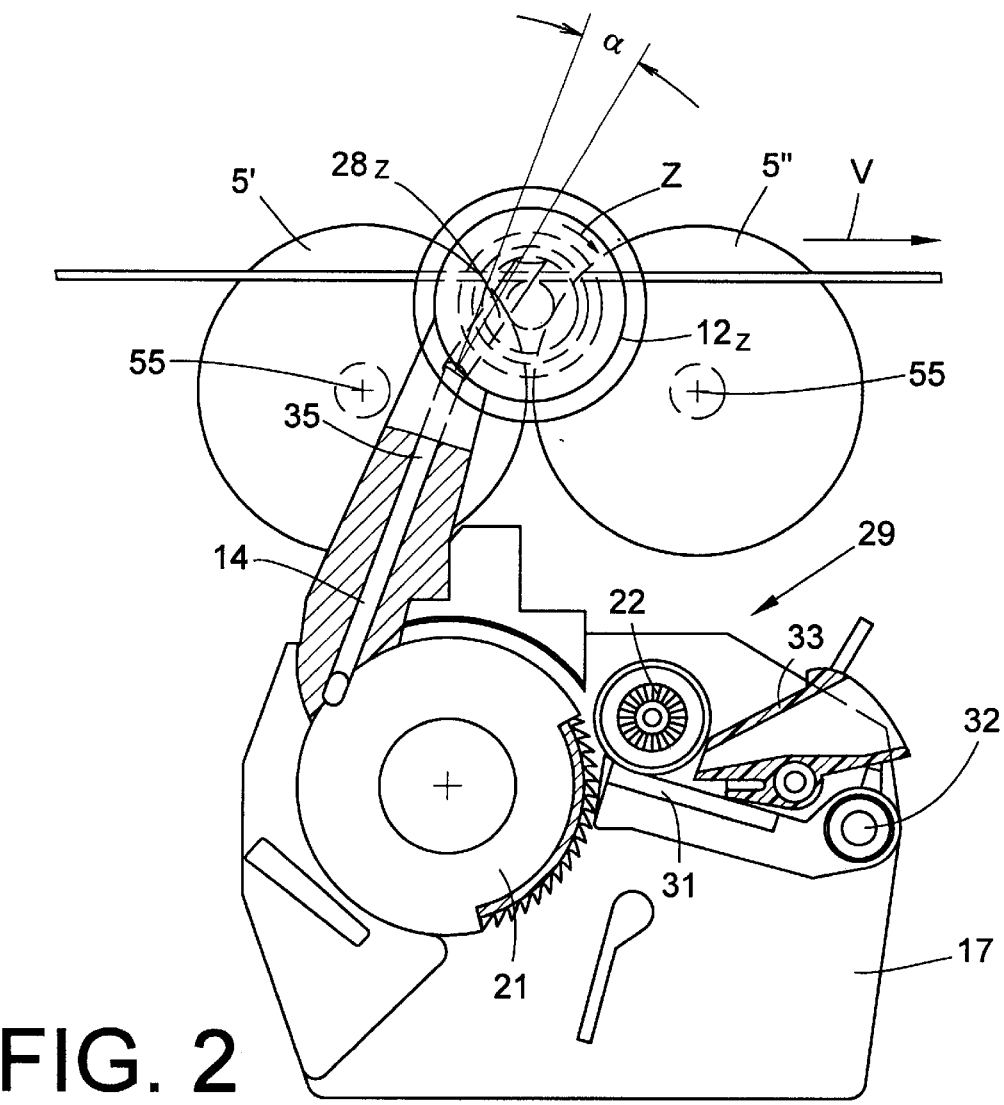
FIG. 2 is a view of the sliver opening device of the open-end spinning device of FIG. 1, as viewed along viewing direction A therein, with a conduit-plate adapter for manufacturing Z-twisted yarn.
Figure 3:
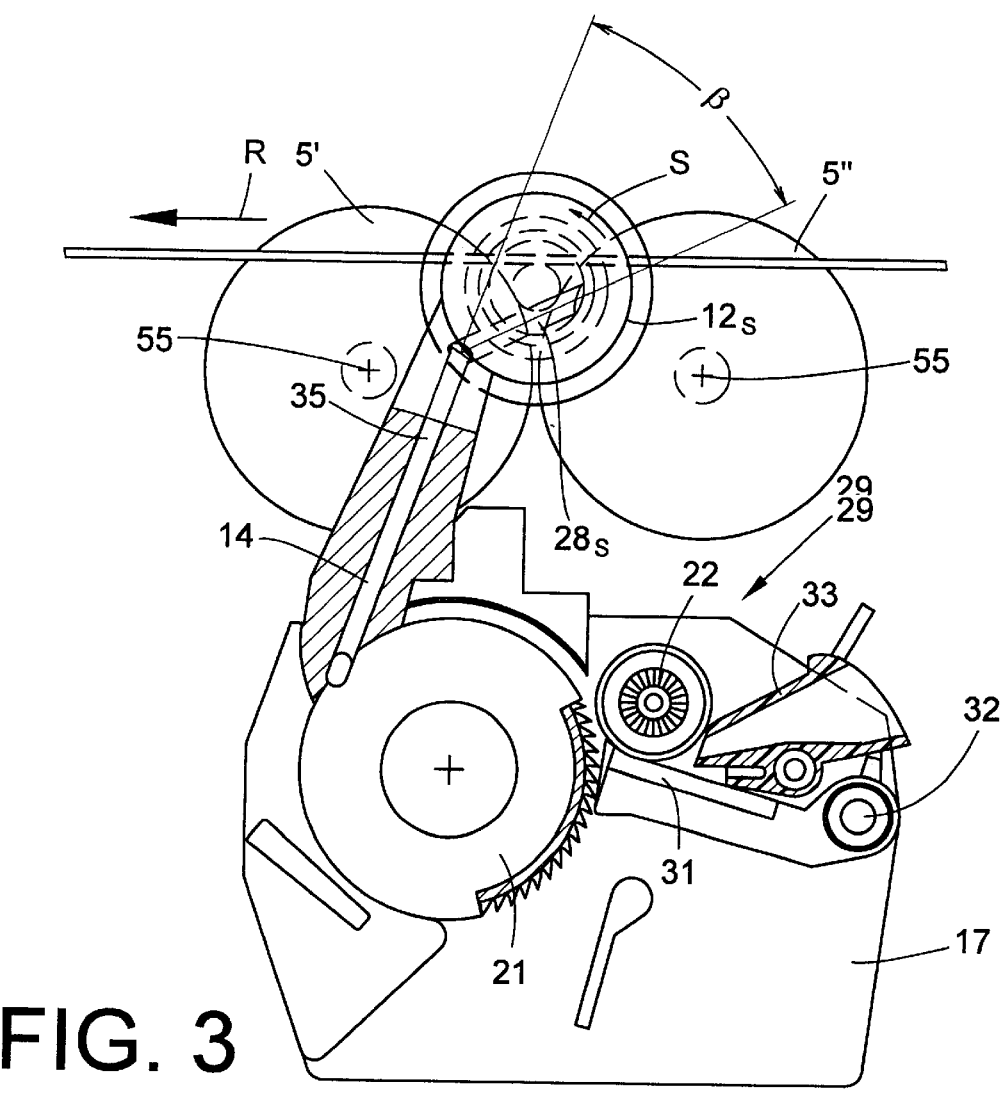
FIG. 3 is a view of the sliver opening device of the open-end spinning device of FIG. 1, also as viewed along viewing direction A, with a conduit-plate adapter for manufacturing S-twisted yarn.

FIGS. 2 and 3 show a front view of a known sliver opening device 29 with opening roller housing 17, opening roller 21 and a sliver feed. The sliver feed consists of sliver draw-in cylinder 22 against which is set feed trough 31, which is supported in such a manner that it can rotate about pivot axis 32. Moreover, sliver compressor 33 is fixed, as is customary, on feed trough 31.

Opening roller housing 17 is connected via fiber guide conduit 14 to conduit plate 27, not shown in FIGS. 2 and 3 for reasons of better clarity. That is, the longitudinal centerline extent 35 of fiber guide conduit 14 communicates into fiber delivery mouth $28_Z$ or $28_S$ at an angle α or β, respectively, with respect to the fiber guide conduit. Each fiber delivery mouth $28_Z$ and $28_S$ thereby extends inside the respective conduit-plate adapter $12_Z$ and $12_S$, which is located in receptacle 34 (not shown) of conduit plate 27.

In order to manufacture Z- or S-twisted yarns, only the desired direction of drive for tangential belt 6 and therewith the direction of rotation Z or S of spinning rotor 3 must be set and the appropriate conduit-plate adapter $12_Z$ or $12_S$ placed into receptacle 34 of conduit plate 27.

Figure 2A:
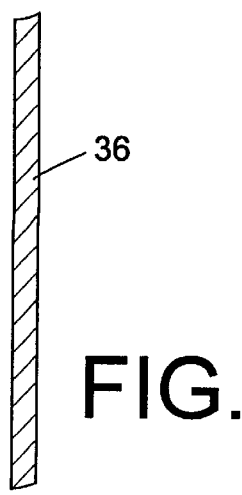
FIG. 2a is a schematic depiction of such Z-twisted yarn.

FIG. 2 shows an open-end spinning device for manufacturing the Z-twisted yarn 36 shown in FIG. 2a. For such purpose, tangential belt 6 is driven by the reversible electromotor (not shown) in direction V so that spinning rotor 3 rotates clockwise.

In this instance, the conduit plate adapter $12_Z$ is used as the conduit-plate adapter, whereby its fiber delivery mouth $28_Z$ is communicated with fiber guide conduit 14 in the mounted state of conduit-plate adapter $12_Z$ at an angle α of less than about 25°, preferably approximately 10°, to centerline area 35 of fiber guide conduit 14. It is thereby assured by such arrangement that the fibers individualized in sliver opening device 29 are fed in a desired manner onto the yarn glide surface of spinning rotor 3.

The selected direction of rotation Z of spinning rotor 3, that is, clockwise rotation of the spinning rotor in this case, as well as the special alignment of fiber delivery mouth $28_Z$ of conduit-plate adapter $12_Z$ result thereby in the production of so-called Z-twisted yarn 36 shown in FIG. 2A on an enlarged scale.

FIG. 3 shows a slightly modified open-end spinning device for the production of so-called S-twisted yarn 37. As is indicated in FIG. 3, tangential belt 6 is driven in this instance in direction R so that spinning rotor 3 rotates in the counterclockwise direction S.

A conduit-plate adapter $12_S$ is inserted into receptacle 34 of conduit plate 27 such that its fiber delivery mouth $28_S$ is communicated with fiber guide conduit 14 in the mounted state of conduit-plate adapter $12_S$ at an angle β of greater than about 40°, preferably approximately 45°, to the centerline area 35 of fiber guide conduit 14. It is hereagain assured in such an arrangement that the fibers individualized in sliver opening device 29 are fed in a desired manner onto the yarn glide surface of spinning rotor 3.

Figure 3A:
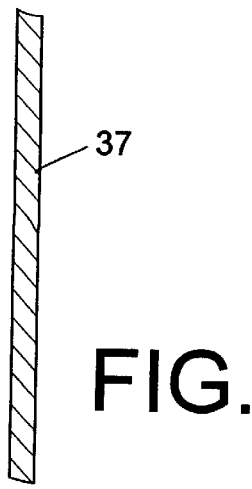
FIG. 3a is a schematic depiction of such S-twisted yarn.

The so-called S-twisted yarn 37 produced in this production process is shown in FIG. 3A, also on an enlarged scale.

Figure 4:
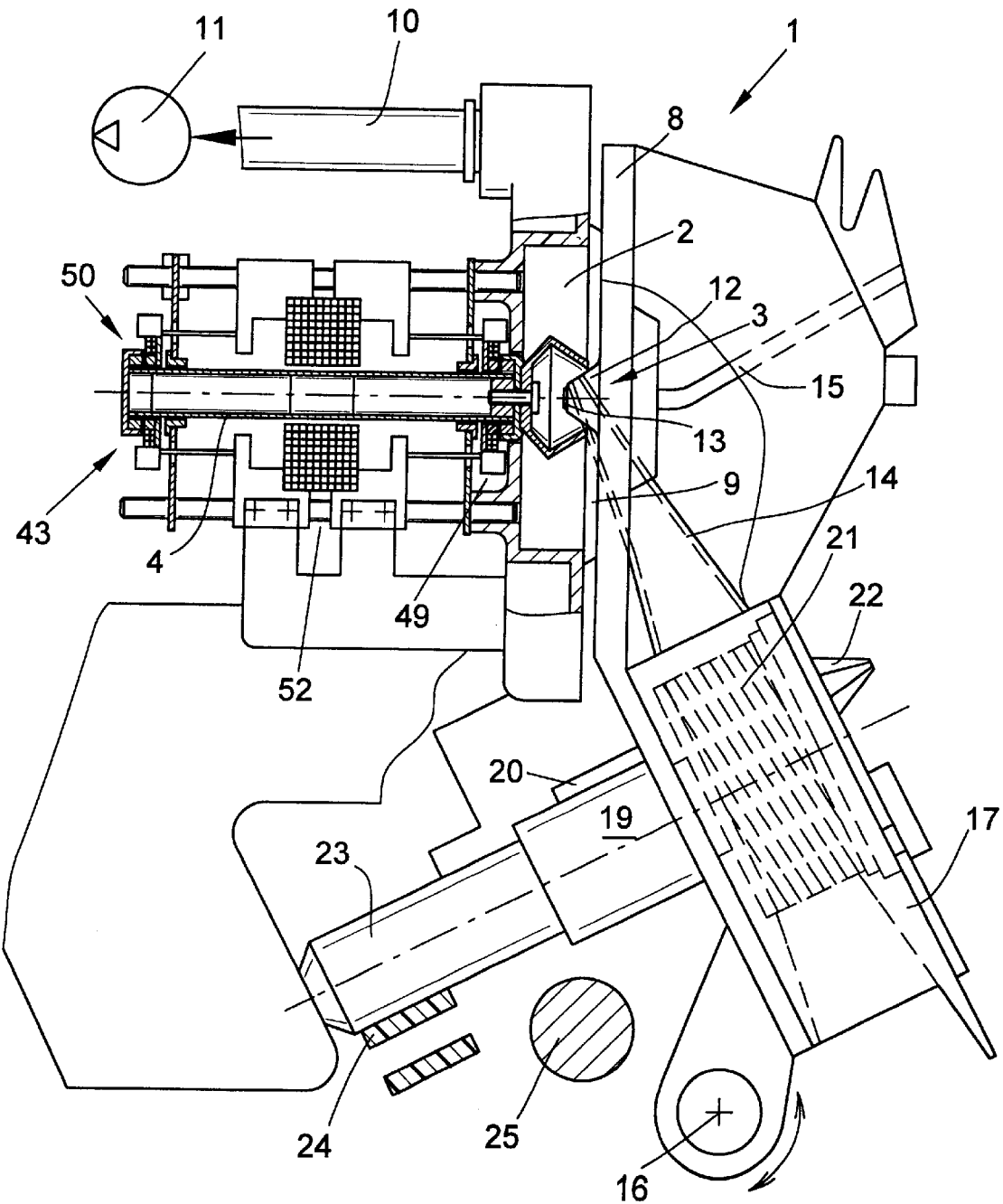
FIG. 4 is a side view, partially in cross section, of an open-end spinning device according to the present invention, with a magnetic spinning-rotor bearing operating in a contactless manner.

Open-end spinning device 1 shown in FIG. 4 corresponds essentially to the open-end spinning device according to FIG. 1 but differs from the latter solely in the type of spinning-rotor bearing. That is, instead of a more conventional support-disk bearing, a magnet-bearing arrangement 43 is provided. As is indicated in FIG. 4, magnet-bearing 43 comprises one bearing component 50 on the free end of the rotor shaft and another bearing component 49 on the end of the rotor shaft adjacent the spinning-cup. The drive of spinning rotor 3, which is separately supported both radially and axially takes place via a respective individual electromotor drive 52. It is particularly apparent from FIG. 5 that bearing components 49, 50 each comprise essentially an annular stator bearing magnet 46 encompassed by coils 44, 45, which can be supplied with current in a defined manner, and a correspondingly annular rotor bearing magnet 29 secured by magnetic band 39.

Figure 5:
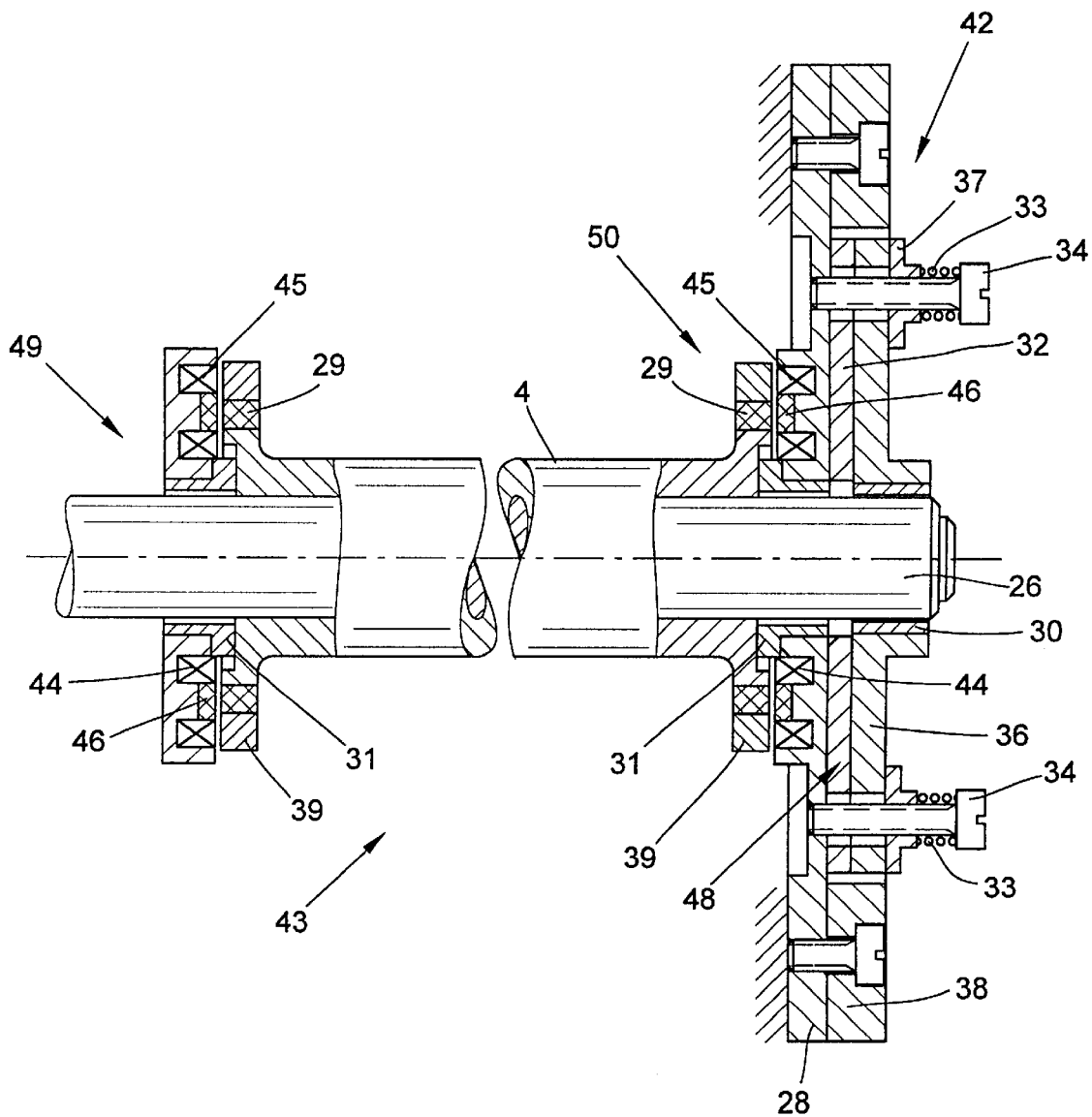
FIG. 5 is an enlarged side view of the magnetic bearing of FIG. 4.

Moreover, in a preferred embodiment an oscillation damping device 42 is arranged in the area of bearing component 50 on the rotor-shaft side. This damping device 42 comprises, as is indicated in FIG. 5, a mechanical friction device 48 comprised essentially of bearing shield 28, intermediate plate 32 and movable friction plate 36. Friction plate 36 is connected by screws 34, springs 33 and pressure platelets 37 with a frictional engagement to bearing shield 28. In addition, journal bearing bushing 30 is fixed in middle bore 26 of movable friction plate 36.

Permanent magnet ring 46 as well as concentrically arranged ring coils 44, 45 of magnetic bearing component 50, which coils can be supplied with current, are positioned in corresponding recesses of stationary bearing shield 28. Permanent magnet bearing ring 29 is integrated into a rotationally symmetric collar of rotor shaft 4 to stand in opposed facing relation to permanent magnet ring 46 on the stator side at a slight distance. Moreover, a limiting bearing designated by 31 is set into stationary bearing shield 28 opposite the journal bearing bushing 30 set into movable friction plate 36.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An open-end spinning device adapted for selectively spinning S-twist and Z-twist yarns, the open-end spinning device comprising a vacuum-loaded rotor housing, a spinning rotor supported for driven rotation at a high speed free of axial thrust and having a rotor cup disposed for rotation within the rotor housing, a conduit plate for closing the rotor housing, the conduit plate comprising an adapter receptacle and a fiber guide conduit for delivering fibers for spinning into the spinning rotor, a reversible drive for rotation of the spinning rotor selectively in opposite directions of rotation, and first and second conduit-plate adapters for interchangable receipt in the adapter receptacle of the conduit plate, each conduit plate adapter having a fiber delivery mouth for communication with the fiber guide conduit, the fiber delivery mouth of the first conduit plate adapter being oriented in coordination with one direction of rotation of the spinning rotor for producing an S-twist yarn and the fiber delivery mouth of the second conduit plate adapter being oriented in coordination with the other direction of rotation of the spinning rotor for producing a Z-twist yarn.

2. The open-end spinning device according to claim 1, wherein the second conduit-plate adapter is received in the adapter receptacle of the conduit plate with the fiber delivery mouth of the second conduit plate adapter oriented at an angle of less than about 25° to the fiber guide conduit.

3. The open-end spinning device according to claim 2, wherein the second conduit-plate adapter is received in the receptacle of the conduit plate with the fiber delivery mouth of the second conduit plate adapter oriented at an angle of approximately 10° to the fiber guide conduit.

4. The open-end spinning device according to claim 1, wherein the first conduit-plate adapter is received in the receptacle of the conduit plate with the fiber delivery mouth of the first conduit plate adapter oriented at an angle of greater than about 40° to the fiber guide conduit.

5. The open-end spinning device according to claim 4, wherein the first conduit-plate adapter is received in the receptacle of the conduit plate with the fiber delivery mouth of the first conduit plate adapter oriented at an angle of approximately 45° to the fiber guide conduit.

6. The open-end spinning device according to claim 1, further comprising a support-disk bearing having support-disk pairs rotatable about parallel axes of rotation and defining a bearing nip in which a support shaft of the spinning rotor is supported, and a magnetic thrust bearing for fixing axially the support shaft of the spinning rotor on the support-disk bearing to prevent imposition of axial thrust on the support shaft.

7. The open-end spinning device according to claim 1, further comprising a magnet-bearing arrangement for supporting and positioning the spinning rotor radially and axially without imposition of axial thrust thereon.

8. The open-end spinning device according to claim 7, wherein the reversible drive further comprises a direct electromotor drive for the spinning rotor.

9. The open-end spinning device according to claim 7, wherein direction of rotation of the spinning rotor is selected and the conduit plate adapter is configured for spinning a Z-twist yarn.

10. The open-end spinning device according to claim 7, wherein direction of rotation of the spinning rotor is selected and the conduit plate adapter is configured for spinning an S-twist yarn.

11. The open-end spinning device according to claim 1, wherein each conduit-plate adapter is received in the adapter receptacle of the conduit plate with the fiber delivery mouth thereof oriented at a selected angle to the fiber guide conduit in coordination with the selected direction of rotation of the spinning rotor.

\* \* \* \* \*